March 16, 1937.    S. B. HASELTINE    2,073,794
HAND BRAKE
Filed April 1, 1935
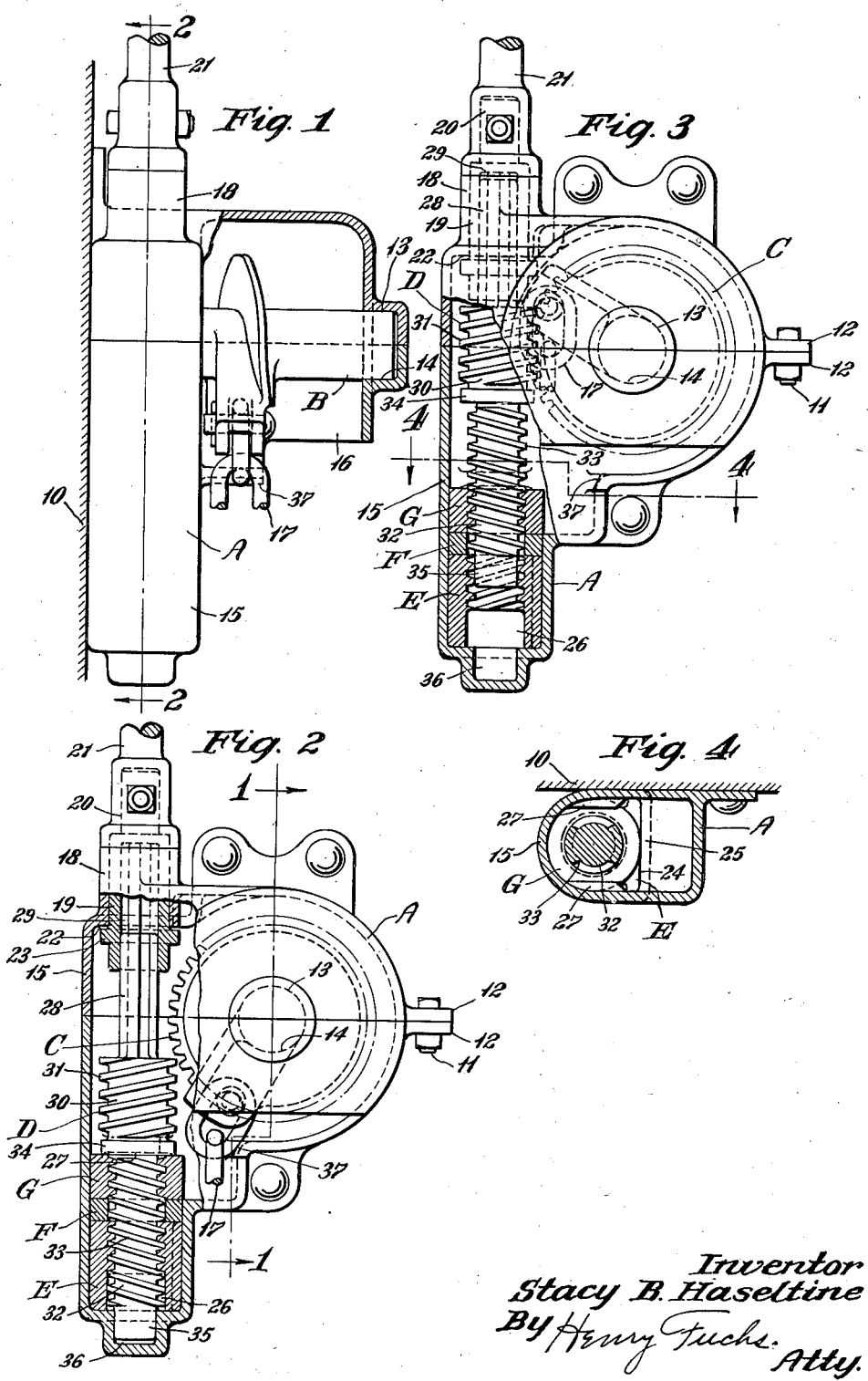
Inventor
Stacy B. Haseltine
By Henry Fuchs.
Atty.

Patented Mar. 16, 1937

2,073,794

UNITED STATES PATENT OFFICE 2,073,794

HAND BRAKE

Stacy B. Haseltine, Chicago, Ill., assignor to W. H. Miner, Inc., Chicago, Ill., a corporation of Delaware Application April 1, 1935, Serial No. 14,027

20 Claims. (Cl. 74—505)

This invention relates to improvements in hand brakes of the worm gear driven type, especially adapted for use in connection with railway cars.

One object of the invention is to provide in a hand brake mechanism of the type indicated, screw means, the operation of which is automatically controlled by rotation of the hand operated means by which the worm gearing of the brake mechanism is actuated, for effecting disengagement of the worm gear members from each other after the brakes have been backed off to a predetermined extent and while the rotary hand operated means is rotated in brake releasing direction, and for effecting reengagement of the worm gear members with each other upon rotation of the hand operated means in brake tightening direction, wherein the screw means is protected from damage at the time that the worm gear members are completely engaged with each other and while the mechanism is operated to tighten or apply the brakes.

Another object of the invention is to provide in a brake mechanism of the character specified in the preceding paragraph screw means comprising cooperating screw and nut elements, wherein one of said elements is fixed and the other of said elements is movable and operatively connected to one of the worm gear members to displace the latter axially in one direction when said movable and fixed elements are being screwed one into the other to disengage the worm members from each other, and to displace said axially movable gear member in a reverse direction when said movable element is being unscrewed from the fixed element, and means for supporting said movable element against thrust action of the brake mechanism at the time said movable element is completely disengaged from the fixed element and the brakes are being tightened, to thereby protect the fixed and movable elements from damage.

Other objects of the invention will more clearly appear from the description and claims hereinafter following.

In the drawing forming a part of this specification, Figure 1 is a side elevational view, partly in section, of a hand brake mechanism embodying my improvements, the mechanism being shown in the position it occupies when applied to the end wall of a railway car, and the part section being taken on the line 1—1 of Figure 2. Figure 2 is a part front elevational view and part vertical sectional view of the mechanism shown in Figure 1, the part section corresponding substantially to the line 2—2 of Figure 1. Figure 3 is a view similar to Figure 2, but showing the parts of the mechanism in a different position. Figure 4 is a horizontal sectional view, corresponding substantially to the line 4—4 of Figure 3.

In said drawing, 10 indicates the end wall of a railway car on which my improved brake mechanism is mounted.

My improved mechanism comprises broadly a housing A; a chain winding drum B within the housing; a worm gear C; a worm D; a fixed nut E having threaded engagement with screw means on the worm; a thrust ring F; and a rotary nut G in constant engagement with the screw means of the worm.

The housing A comprises upper and lower sections, secured together by bolts 11, or any similar securing elements, extending through flanges 12—12 formed on said sections. The housing is fixed to the end wall of the car and has the chain winding drum B mounted therein for rotation about a horizontal axis. The winding drum B and the worm gear C are preferably formed integral, and, as shown, are in the form of a one piece casting having journal portions 13 at opposite ends thereof rotatably supported in suitable bearing pockets or seats 14—14 provided in the opposite side walls of the housing. At the left hand side, as viewed in Figures 1, 2, and 3, the housing comprises a vertically elongated portion 15 within which the worm D, the nut E, the thrust ring F, and the nut G are mounted. The right hand portion of the housing A, as viewed in Figure 1, is open at the bottom, as indicated at 16, to accommodate the brake chain for movement. The brake chain, which leads to the brake mechanism proper of the car, is indicated by 17, and has the end link thereof anchored to the winding drum B in any well-known manner. The vertical portion 15 of the housing has a bearing portion 18 at the upper end thereof provided with a vertical bearing opening within which a socket member 19 is rotatably supported. At the upper end, the socket member 19 is formed with a stem 20 to which the brake shaft or staff 21 is fixed. The lower end of the brake staff 21 is socketed to receive the stem 20 and rests on the bearing portion 18 to hold the parts against downward displacement. Below the bearing portion 18, the housing portion 15 is enlarged, as shown in Figures 1, 2, and 3, thereby providing an abutment shoulder 22. The socket member 19 is further provided with an annular flange 23 which limits the upward movement of said socket by engagement with the shoulder 22.

The lower end section of the portion 15 of the housing is of the cross section shown in Figure 4, and contains the fixed nut E. The nut E fits said lower end portion and has a flat vertical face 24 which bears on the flat wall 25 of said lower section of the housing portion 15, so that the nut will be held against rotation.

As shown, the nut E is provided with left threads. The lower portion of the opening through the nut E is not threaded, as indicated at 26, thereby providing a substantial cylindrical opening of larger diameter than the threaded portion of said nut.

The thrust ring F is supported on the nut E and is freely rotatable with respect to the other parts of the mechanism, the opening of said ring being of such a size as to loosely accommodate the screw means at the lower end of the worm element D.

The nut G is cylindrical, as clearly shown in Figure 4, and is supported on the thrust ring F, as shown in Figures 2 and 3. The nut G is freely rotatable on the ring F, but is held against upward displacement by a pair of ribs 27—27 formed on the opposite walls of the housing portion 15. The ribs 27—27 overhang the top of the nut G, as clearly shown in Figure 4. As will be evident, the ribs 27—27 act as stop shoulders to hold the whole assembly, comprising the nuts E and G and the thrust ring F, against upward displacement.

The worm D has a stem 28 at the upper end fitting within the opening 29 of the socket member 19. The worm D is rotatable in unison with the socket member 19 and the brake staff 21, the opening 29 of the socket member and the stem 28 of the worm D being of non-circular cross section and having a sliding fit with each other, so that the worm D is compelled to rotate with the staff 21. Below the stem 28, the worm D is enlarged, as indicated at 30, said enlarged portion having right threads 31 thereon, adapted to mesh with the threads of the worm wheel or gear C. Below the threaded section 30, the worm D is reduced in diameter, as indicated at 32, said reduced portion having left screw threads 33 thereon engaged with the threads of the nut G and also cooperating with the threads of the fixed nut E. Between the threaded sections 31 and 33, the worm D is provided with a collarlike portion 34, adapted to have shouldered engagement with the top of the nut G to limit downward displacement of said worm. The extreme lower end portion of the worm is of cylindrical cross section, as indicated at 35, and is adapted to seat in a pocket 36 provided at the bottom of the housing portion 15. In this connection it is pointed out that the lower section of the housing portion 15 also serves as a reservoir for lubricant for lubricating the screw means and other parts of the mechanism. As will be understood, the staff 21 of the brake mechanism is provided with the usual hand wheel, not shown, at the upper end thereof, by which the worm is rotated.

The operation of my improved hand brake mechanism, assuming the parts to be in the position shown in Figure 3, is as follows in applying the brakes: The staff 21 is rotated in a right hand direction by means of the hand wheel, thereby rotating the worm D in a like direction and causing the worm wheel C to rotate in a right hand direction, as viewed in Figure 3, thereby effecting winding of the chain 17 on the drum B. During the described operation of the brake mechanism, the worm is held in the position shown in Figure 3, the rotary nut G supporting the worm and taking the thrust. As will be evident, during said winding operation, the thrust is in a downward direction on the worm, as seen in Figure 3. The thrust ring F, which is freely rotatable also, facilitates the rotary movement of the nut G without producing excessive friction between the parts. Inasmuch as the nut G maintains the worm D in the raised position shown in Figure 3, during the brake tightening operation the lower ends of the threads 33 will be maintained in a position where they do not engage the upper ends of the threads of the nut E, thereby preventing damage to the threads of the nut E and the worm D, which would otherwise occur if the lower end of the screw threaded portion 32 of the worm were permitted to ride directly on the upper ends of the threads of the nut E. In effecting release of the brakes, the brake staff 21 is rotated in a left hand direction, thereby effecting rotation of the worm D in a like direction and causing the screw threads 33 of the worm to screw downwardly in the nut G while the threads 30, which cooperate with the worm gear C, effect backing off of the brakes through partial unwinding of the chain 17 from the drum B. Downward displacement of the threaded lower end portion of the worm D causes the threads thereof to engage with the threads of the fixed nut E, thereby forcibly lowering the worm D until the parts reach the position shown in Figure 2, whereupon the worm threads 30 are completely disengaged from the worm wheel C, thereby permitting free rotation of the worm gear C and the drum B and complete release of the brakes. Rotation of the drum B and worm gear C will be stopped in the position shown in Figures 1 and 2 by engagement of the inner end link of the chain 17 with a stop shoulder 37 formed on the housing, thereby, when the brakes are completely released, always positioning the gear C so that the screw threads thereof will be matched with the threads 31 of the worm D when the latter is raised through the cooperating nut E and threads 33 of the worm D. Assuming the parts to have been left in the position shown in Figures 1 and 2, rotation of the staff 21 and the worm D in brake tightening direction will cause the threaded section 33 of the worm D to be screwed upwardly in the fixed nut E to engage the threads 31 of the worm with the threads of the worm wheel C and the parts are again brought to the position shown in Figure 3. With the parts in the position shown in Figure 3, further tightening of the brake mechanism is effected in the manner hereinbefore described.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a chain winding element; of cooperating worm gear members for rotating said element; screw means for displacing one of said worm gear members with respect to the other to effect disengagement of said members from each other and reengagement thereof, said screw means including a fixed nut and a cooperating screw member; and means for opposing movement of said screw member toward said nut during rotation of the worm gear member in brake tightening direction to prevent active engagement of the threads of the screw with the threads of the fixed nut.

2. In a hand brake mechanism, the combination with a chain winding element; of cooperating worm gear members for rotating said element; screw means for displacing one of said worm gear members with respect to the other to effect disengagement of said members from each other when said mechanism is operated in chain unwinding direction, and to effect engagement of said worm gear members with each other when the mechanism is operated in chain winding direction, said screw means comprising cooperating nut and screw members, one of said last named members being stationary and the other being rotatable and axially movable to be engaged with, and disengaged from, said stationary member; and means for opposing movement of said rotatable member toward said stationary member during rotation of the worm gear members in brake tightening direction, to prevent active engagement of the threads of said rotary member with the threads of the fixed member.

3. In a hand brake mechanism, the combination with a chain winding element; of a worm gear for rotating said winding element; a rotatable worm having threads engageable with the worm gear for actuating the latter, said worm being axially displaceable; a member in fixed relation to said worm and rotatable therewith, said last named member being threaded reversely to said worm; a fixed nut with which said threaded member is engageable; and means for holding said threaded member against movement toward fixed nut while brakes are being tightened, to hold the threads of said threaded member out of active engagement with the threads of the nut.

4. In a hand brake mechanism, the combination with a chain winding element; of a worm gear for rotating said element; a rotatable and axially displaceable worm engageable with the worm gear for rotating the latter; screw means for axially displacing said worm, comprising cooperating screw and nut members, one of said members being fixed and the other member being rotatable, said rotatable member being fixed to the worm; and means for opposing movement of said last named member toward the other member of said screw means while the brakes are being operated in brake tightening direction to prevent active engagement of the threads of said rotatable member of the screw means with the fixed member of the screw means.

5. In a hand brake mechanism, the combination with a rotary chain winding element; of a worm gear for rotating said element; a fixed threaded member; a rotary actuating member having reversely threaded sections thereon, one of said threaded sections being engageable with the worm gear, and the other of said threaded sections being engageable with said fixed threaded member, said actuating member being axially slidable to engage the same with the worm gear and disengage the same therefrom, said actuating member being moved axially by unscrewing of said actuating member from the fixed threaded member and by said actuating member being screwed onto said fixed threaded member; and means for opposing movement of said actuating member toward said fixed threaded member while the brakes are being operated in brake tightening direction to prevent active engagement of the threads of said actuating member with the fixed threaded member.

6. In a hand brake mechanism, the combination with a rotary winding element; of a worm gear for rotating said element; a fixed threaded member; a correspondingly threaded rotary member in axial alignment with said fixed threaded member and rotatably supported on said fixed member; a rotary actuating member having reversely threaded sections thereon, said last named member being axially slidable, the threads of one of said sections corresponding to the threads of the worm gear and being engageable therewith, and the threads of the other of said sections corresponding to, and being engaged with, the threads of said rotary member and adapted to engage with the threads of said fixed member and screwed onto the latter when the brake mechanism is operated in one direction and unscrewed therefrom when said mechanism is operated in reverse direction.

7. In a hand brake mechanism, the combination with a rotary winding element; of a worm gear for rotating said element; a fixed threaded member; a rotary thrust ring abutting said fixed member and coaxial therewith; a rotary member correspondingly threaded to and in axial alignment with said fixed member and rotatably supported against said ring; a rotary actuating member having reversely threaded sections thereon, said member being axially slidable, one of said threaded sections being engageable with the worm gear and the other of said threaded sections being correspondingly threaded to and engaged with the threads of said rotary member and adapted to engage with the threads of said fixed member and screwed onto the latter when the brake mechanism is operated in one direction and unscrewed therefrom when said mechanism is operated in a reverse direction.

8. In a hand brake mechanism, the combination with a winding element; of a worm gear for rotating said element; a fixed threaded member; a rotary threaded member coaxial therewith; and a worm having two sets of threads thereon, one of said sets being left and the other being right, said worm being rotatable and axially slidable, one of said sets of threads of the worm being engaged with the rotary threaded member and being engageable with the fixed threaded member, and the other set of threads being adapted to cooperate with the threads of the worm gear for actuating the latter.

9. In a hand brake mechanism, the combination with a winding element; of a worm gear for rotating said element; a fixed threaded member; a rotary threaded member coaxial therewith; a thrust washer interposed between said fixed and rotary threaded members; and a worm having two sets of threads thereon, one of said sets being left and the other being right, said worm being rotatable and axially slidable, one of said sets of threads of the worm being engaged with the rotary threaded member and engageable with the fixed threaded member, and the other set of threads being adapted to cooperate with the threads of the worm gear.

10. In a hand brake mechanism, the combination with a winding element; of a worm gear for rotating said element; a fixed nut; a rotary nut coaxial with said fixed nut; and a worm having two sets of threads thereon, one of said sets being left and the other being right, said worm being rotatable and axially slidable, one of said sets of threads of the worm being engaged with the rotary nut and engageable with the fixed nut, and the other set of threads being adapted to cooperate with the threads of the worm gear.

11. In a hand brake mechanism, the combination with a winding element; of a worm gear for rotating said element; coaxial fixed and rotary nut members; and a rotary and axially movable worm member having two sets of threads thereon, one set being right and the other left, one of said sets of threads being engaged with the rotary nut and movable into and out of engagement with the fixed nut, the other of said sets of threads cooperating with the worm gear.

12. In a hand brake mechanism, the combination with a winding element; of a worm gear for rotating said element; coaxial fixed and rotary nut members; a rotary thrust ring interposed between said nut members; and a rotary and axially movable worm member having two sets of threads thereon, one set of threads being right and the other left, one of said sets of threads being engaged with the rotary nut and extending loosely through said thrust ring and being movable into and out of engagement with the fixed nut, the other of said sets of threads cooperating with the worm gear.

13. In a hand brake mechanism, the combination with a winding element; of a worm gear for rotating said element; coaxial fixed and rotary nut members held against axial movement; and a rotary and axially slidable worm member having threaded engagement with the rotary nut and adapted to be screwed into and unscrewed from said rotary nut, said worm member being operatively engageable with the worm gear to actuate the same.

14. In a hand brake mechanism, the combination with a rotary winding element; of a worm gear for rotating said element; coaxial fixed and rotary left threaded nut members; and a rotary and axially slidable worm, said worm having right and left threaded sections, said right threaded section being engageable with the worm gear, and said left threaded section being engaged with said rotary nut and engageable with the fixed nut.

15. In a hand brake mechanism, the combination with a winding element; of a worm gear for rotating said element; coaxial vertically aligned fixed and rotary nut members; and a rotary and axially slidable worm cooperating with said worm gear, said worm being rotatable about a vertical axis and having a threaded portion in engagement with said rotary nut member, said threaded portion being engageable with the fixed nut to move said worm axially.

16. In a hand brake mechanism, the combination with a rotary chain winding element; of a worm gear for rotating said element; a fixed nut member; a rotary nut member coaxial with said fixed nut member and supported thereon; and a vertically movable worm rotatable about a vertical axis and cooperating with the worm gear, said worm having a threaded portion extending through the rotary nut and in threaded engagement therewith, said threaded portion thereof being engageable with the fixed nut.

17. In a hand brake mechanism, the combination with a rotary winding element; of a worm gear for rotating said element; a worm engageable with the worm gear, said worm being rotatable about a vertical axis and displaceable in axial direction to engage the same with the worm gear and disengage the same therefrom said worm having right and left threads thereon, the right threads cooperating with the worm gear; a fixed nut adapted to be engaged by the left threads of said worm; and a rotary nut through which said worm extends, said rotary nut having engagement with the left threads of said worm and being rotatably supported on said fixed nut.

18. In a hand brake mechanism, the combination with a rotary winding element; of a worm gear for rotating said element; a fixed nut; a rotary worm member engageable with the worm gear to actuate the latter, said worm member having a threaded section engageable with the fixed nut and adapted to be screwed into said nut when the worm is rotated in brake releasing direction, and adapted to be unscrewed from said nut and completely disengaged therefrom when the worm is rotated in brake tightening direction, said movement of the worm into and out of the nut respectively effecting disengagement and engagement of the worm with the worm gear; and a rotary thrust bearing member in the form of a nut engaged with said threaded section of the worm at all times, said thrust bearing member being rotatably supported by said fixed nut.

19. In a hand brake mechanism, the combination with a chain winding element; of cooperating worm gears for rotating said element, one of said gears being displaceable with respect to the other and being urged to move axially in one direction by the thrust exerted on the worm gears from the winding element when the brake mechanism is being operated; screw means for moving said displaceable gear toward and away from the other gear to effect disengagement of said gears from each other and reengagement thereof, said screw means including a fixed nut member and a cooperating screw member, one of said members being fixed and the other of said members being rotatable and axially movable, said rotatable and axially movable member being operatively connected to said displaceable gear to be advanced endwise in one direction by said thrust action of the displaceable gear, said fixed member being in the path of advance movement of said rotatable and axially movable member to receive the latter in threaded engaging relation; and means for supporting said rotatable and axially movable member against advancing movement toward said nut member during rotation of the worm gear in brake tightening direction to thereby prevent active engagement of the threads of the screw member with the threads of the nut member.

20. In a hand brake mechanism, the combination with a chain winding element; of cooperating worm gear members for rotating said element, one of said gears being axially displaceable through the thrust exerted between said gears by the pull of the brake chain during operation of the brakes; screw means for displacing said displaceable worm gear member with respect to the other gear member to effect disengagement of said members from each other when said mechanism is operated in chain unwinding direction, and to effect engagement of said worm gear members with each other when said mechanism is operated in chain winding direction, said screw means comprising cooperating nut and screw members, one of said last named members being stationary and the other being fixed to said displaceable member for rotation and axial displacement therewith, to be advanced endwise with said gear in the direction of the thrust exerted on said gear, said stationary member being in the path of advancing axial movement of said rotatable member of the screw means and being engaged with said stationary member by the thrust exerted on the worm gear members from the winding element when the brakes are being operated; and means for supporting said rotatable member against said thrust, during rotation of the worm gear members in brake tightening direction to prevent active engagement of the threads of said rotary member of the screw means with the threads of the stationary member.

STACY B. HASELTINE.